2,992,068
METHOD FOR MAKING SYNTHETIC ZEOLITIC MATERIAL
Walter L. Haden, Jr., Metuchen, and Frank J. Dzierzanowski, New Brunswick, N.J., assignors to Minerals & Chemicals Philipp Corporation, a corporation of Maryland
No Drawing. Filed Feb. 20, 1959, Ser. No. 794,538
5 Claims. (Cl. 23—112)

The subject invention relates to a method for converting kaolin clay into a synthetic zeolite which, upon dehydration, yields a sorbent of controlled effective pore diameter and which is generally known as a "molecular sieve." The invention relates, more specifically, to such a method in which the sorbent and its zeolitic precursor are provided in the form of coherent attrition-resistant polycrystalline aggregates, as opposed to pulverulent masses.

A development in the field of adsorbents which has attracted widespread interest has been the production of so-called "molecular sieves." These are synthetic, crystalline alumino-silicate materials chemically similar to many clays and feldspars, and belonging to the class of minerals known as zeolites. The zeolites possess the characteristic of being able to undergo dehydration with little, if any, change in crystal structure. When dehydrated, the crystals are interlaced with regularly spaced channels of molecular dimensions and of quite uniform size, which led to the term "molecular sieve."

Several types of sieves are commercially available, each of which has a characteristic size of pore. They are being or can be used for a wide variety of applications, some of those with the greatest potential being as a desiccant for drying a wide variety of materials to extremely low moisture content, in purifying high quality chemicals and in upgrading gasoline by selective removal of straight chain hydrocarbons. An application which has received recent wide publicity is as a carrier for high activity accelerators for the rapid cure of plastics and rubber, in which case the sieves greatly simplify storage and processing problems by maintaining the active chemical in latent state, isolated from the system, during processing and storing, releasing it to function in its normal manner at the elevated curing or vulcanization temperature.

Molecular sieves are available in several types, designated, for example, as 3A, 4A, and 5A. Type 3A and type 4A sieves are dehydrated potassium and sodium zeolites, respectively, and type 5A, the dehydrated calcium zeolite, the three zeolites having the same crystalline structure and being readily interchangeable by simple base-exchange procedures. The numerical positions of the type designations refer to pore dimensions in Angstrom units. The formula for members of the type A zeolites from which the type A sieves are prepared by dehydration may be represented by the following approximate empirical formula:

$$X_{\frac{2}{v}}O \cdot Al_2O_3 \cdot 2SiO_2 \cdot YH_2O$$

wherein "X" represents a metal in groups I and II of the periodic table, transition metals of the periodic table, hydrogen or ammonium, or mixtures of the aforementioned; "v" represents the valence of X; and Y varies with the nature of X and may be a number up to about 6. Thus, for example, the empirical formula for the 4A zeolite is $Na_2O \cdot Al_2O_3 \cdot 2SiO_2 \cdot 4-5H_2O$. Sodium A zeolite may be considered the parent of the other type A zeolites in that it can be base-exchanged with other group I and with group II metal ions, etc., to prepare the other members of the type A zeolites described by the empirical formula given above.

The 4A molecular sieve, which has the empirical formula $Na_2O \cdot Al_2O_3 \cdot 2SiO_2$, is particularly useful as a selective sorbent for water, although it is also useful in selectively sorbing low molecular weight hydrocarbon vapors from mixtures of low molecular weight hydrocarbons with higher molecular weight hydrocarbons. For example, the 4A molecular sieve is used in sorbing certain C-2 and C-3 hydrocarbons from mixtures with higher molecular weight hydrocarbons. The 5A molecular sieve is useful in selectively sorbing vapors of normal hydrocarbons from mixtures with branched chained hydrocarbons of similar molecular weight.

The extensive use of the type A sieves is, however, curtailed by their high cost which reflects the involved processing as well as the relatively expensive raw materials involved in their preparation. The price of molecular sieves is at present prohibitive for all but a few specific applications. Aside from their high cost, another detractive feature of the commercially available sieves and those described in the literature is that their physical form leaves much to be desired. Mineral sorbents find widespread use in moving and fixed bed adsorption processes, and in such processes, the sorbent is employed in the form of coarse particles. In moving and fixed bed processes it is necessary to use particles of sufficient size that the pressure drop is small; sorbent particles as coarse as 4/8 mesh or as fine as 60/100 mesh are employed in commercial moving and fixed bed processes. In slurry processes or other processes in which the sorbent is mixed or carried co-current with the fluid, particles in the range 100/325 mesh are used. In all of the aforementioned processes, the sorbent particles may be irregular in shape, but are preferably in the form of regularly contoured masses, such as spheres; moreover, it is important that the sorbent particles be sufficiently hard or attrition resistant so that they do not wear away during use, regeneration or other handling.

Prior art methods of producing synthetic crystalline A type zeolites are basically inconsistent with the provision of such coarse particle size sorbents inasmuch as the resulting zeolite crystals inherently are of finely divided, powdered form, typically 0.5 to 5 microns material. In order to agglomerate the powdered zeolites or sorbents, binders, such as clays, are used. Typically, the zeolite powder is extruded with the binder, and pellets of suitable size are cut from the extrudate. The pellets are then fired to harden the pellet. In order to produce pellets of adequate resistance to attrition, substantial quantities of binder are used, often up to 20% or more, based on the weight of the active sorbent. As a result, the pelleted sorbent is substantially diluted and the sorptive capacity of a unit weight is decreased markedly. Moreover, the coherency of the bound powder leaves much to be desired in that the material is readily attrited during storage and use. Obviously, it would be highly desirable to be able to synthesize the type A zeolites and molecular sieves in the form of large attrition-resistant aggregates of homogeneous polycrystalline composition and, more particularly, to synthesize such zeolites and sieves in the form of pellets or other regularly shaped masses of the desired particle size.

Accordingly, it is an object of the present invention to provide a method for preparing type A zeolitic materials which obviates the aforementioned difficulties.

Another object of the invention is the provision of a method to synthesize type A zeolites and molecular sieves directly in the form of coherent aggregates of substantially homogeneous polycrystalline composition as contrasted with the powdered form which results from prior art methods for making such zeolites.

A more particular object is the provision of such a method in which kaolin clay, an inexpensive, naturally-occurring, abundant material, is employed as the sole source of silica and alumina.

These and further objects and advantages, which will be apparent to those skilled in the art, are realized in accordance with the present invention wherein the synthetic crystalline zeolite which is the precursor of the type A molecular sieve is made from kaolin clay by a process in which the zeolite is formed directly as relatively large coherent aggregates of substantially pure homogeneous polycrystalline composition, rather than in the form of a powder, as in prior art methods. The zeolite then may be dehydrated to provide a molecular sieve of high purity in the form of a hard coherent aggregate. Further, the synthetic zeolite may be base-exchanged with a suitable ion to produce a base-exchanged zeolite which, upon dehydration, is converted into a molecular sieve of a different desired pore diameter.

A preferred embodiment of our invention involves the preparation of uniformly sized and shaped aggregates of substantially pure type A zeolites and sieves which are hard and coherent, although free from binders.

Broadly stated, the present invention contemplates the conversion of dehydrated kaolin clay by a relatively concentrated caustic solution into a type A zeolite. In accordance with the method of our invention, a mixture of dehydrated kaolin clay and alkali, in the form of a compact mass or masses thereof, are reacted at a low temperature to form a solid coherent amorphous reaction product which is then crystallized to form coherent substantially homogeneous polycrystalline aggregates of the synthetic zeolite. Preferably the method of our invention involves the step of shaping the mixture of calcined kaolin clay and caustic into compact masses of the shape and size desired for the ultimate zeolitic material prior to the advance of the reaction therebetween since such form can be retained throughout the process of our invention.

The sorbent prepared in accordance with this procedure is inexpensive and represents a very substantial economic advantage over similar sorbents made in accordance with prior art techniques because of the simplicity of the processing, particularly since it obviates the step of binding the zeolitic product into the desired coarse particles.

Moreover, by the method of this invention, we are able to prepare hard pelleted zeolites and sorbents without auxiliary binder material, and thus provide for the first time a substantially pure A type zeolite or sieve material in the form of hard coherent aggregates which are highly resistant to disintegration, even in the presence of liquid water.

As previously indicated, the method of the present invention is directed to the conversion of dehydrated kaolin clay into a synthetic crystalline zeolite. By "kaolin clay" is meant a naturally-occurring clay containing at least one of the following as the chief mineral constituent: kaolinite, halloysite, anauxite, dickite and nacrite. The aforementioned minerals are hydrous aluminosilicates whose composition may be represented by the formula:

$$Al_2O_3 \cdot 2SiO_2 \cdot XH_2O$$

where X is usually 2, or 4 in the case of certain halloysites. The weight ratio of $SiO_2$ to $Al_2O_3$ indicated by this formula is 1.77 to 1. The kaolin clay we prefer to employ has a $SiO_2/Al_2O_3$ weight ratio as close to the theoretical value of 1.177 as is possible in order to provide a substantially pure zeolite. However, kaolin clays having somewhat higher or lower $SiO_2/Al_2O_3$ weight ratios, e.g., 1.177±0.030, may be used with good results, although the ultimate zeolite will be somewhat less pure than when the ratio of 1.177 to 1 is used. An additional source of silica or alumina, e.g., sodium aluminate, can be incorporated in the clay-alkali mix to adjust the $SiO_2/Al_2O_3$ weight ratio in the clay-alkali mixture. Thus, in using anauxite, which has a higher $SiO_2/Al_2O_3$ ratio than other kaolin clays, the addition of a small amount of sodium aluminate to the dehydrated kaolin clay-alkali mix is indicated. Kaolin clays are frequently associated with foreign materials such as quartz and the removal of such materials from the kaolin facilitates the ultimate formation of the high purity type A zeolite. Hence, we prefer to use a kaolin clay which has been treated for removal of grit and foreign bodies, as well as clots of undispersed kaolin clay.

An essential feature of our invention involves the use of substantially completely dehydrated kaolin clay since when the steps hereafter set forth are applied to the hydrated clay, the desired product is not formed. The clay may be dehydrated by calcination at a temperature within the range of from about 800° F. to about 1600° F., and preferably 1200° F. to 1500° F., for a time sufficient to remove substantially completely the water of crystallization from the clay. The calcination time will vary with calcination temperature and with the equipment used. When the clay is calcined at temperature levels lower than about 800° F., the dehydration is not sufficiently extensive to render the clay suitable for total conversion to the zeolite whereas when calcination is conducted at about 1600° F. or higher undesirable changes in the clay may take place. The clay may be calcined at a temperature somewhat above 1600° F. if the calcination treatment is limited to a period of the order of minutes. At any rate, we find that if the calcination is too severe, the clay is altered with the formation of an unreactive constituent, thought to be mullite. When such an overcalcined clay is reacted in accordance with the method of the present invention, a different crystalline material is formed along with or to the exclusion of the desired A type zeolite. Thus, for the purposes of our invention, we distinguish between "reactive" and "unreactive" dehydrated kaolin clay and are careful to select a "reactive" dehydrated kaolin clay which we consider to be a kaolin calcined under conditions such that high temperature unreactive aluminosilicate, silica or alumina phases are not formed, so that essentially all of the dehydrated clay will react with alkali in amount stoichiometric for the formation of the A type zeolite.

The caustic we employ in our process is preferably NaOH, although KOH or mixtures of these alkalis may be used. The caustic is used in the form of a concentrated aqueous solution thereof, viz., about a 30% to about a 55% solution, and preferably a 40% to 50% solution. The use of a concentrated caustic solution is an essential feature of our invention inasmuch as we find that if we employ a less concentrated solution, e.g., a 10 or 20% solution, we produce a zeolite in the form of a fine powder or very soft aggregate, and thus fail to realize an important objective of our invention. The upper limit of the caustic concentration is dictated by both the solubility of the caustic at the reaction temperature and the necessity for confining the quantity of caustic solution to that which will form a compact mass when mixed to apparent homogeneity with the calcined clay. As a rule, we prefer to use as high a concentration of alkali as in consistent with forming a mix of appropriate consistency, inasmuch as it has been found that the use of solutions of higher alkali concentration favors the provision of an ultimate zeolite or sieve of higher resistance to attrition. Thus, in general, the sieve prepared by reacting kaolin clay with a NaOH solution of 50% concentration will be harder than a similar zeolite of like size and form prepared with a 30% solution.

The quantity of concentrated caustic solution we mix with the calcined clay is preferably that sufficient to supply the amount of caustic theoretically required for the formation of  $X_2O \cdot Al_2O_3 \cdot 2SiO_2$ (wherein X is Na, K, or mixtures thereof) with the clay; this theoretical quantity for a kaolin having a $SiO_2/Al_2O_3$ weight ratio of 1.177 to 1 calculates to be 9.0 gram mols of alkali per kilogram of clay, based on the volatile-free weight of the clay (volatile-free weight being the weight of clay after heating essentially to constant weight at 1800° F.). In other words, employing a NaOH solution, we preferably employ a 36% alkali dosage in our process, alkali dosage being defined as the weight of 100% NaOH per weight (volatile-free basis) of clay, expressed as a percentage. We may use a quantity of alkali such as to provide somewhat more or less than the theoretical amount of alkali; that is, from about 8.25 to 9.75 gram mols of alkali per kilogram of clay, volatile-free basis, and realize outstanding conversion of the clay to the zeolite. Any excess alkali should be washed from the clay-alkali reaction product before it is crystallized. However, if we use a quantity of alkali considerably in excess of the theoretical quantity, a contaminated or a different product is produced. For example, using about a 50% weight excess of NaOH, essentially no sodium zeolite A is formed.

The first step of the method of our invention involves the step of forming an apparently homogeneous mixture of clay, previously calcined to a reactive state, and concentrated caustic, using the quantities of reactants hereabove set forth. We may employ any suitable apparatus, such as a pug mill, to mix the ingredients. The resultant mix will be a semisolid mass, the degree of plasticity of which depends principally on the concentration of the alkali solution employed.

It is critical to the successful formation of the zeolite in the form of hard coherent coarse particles that the reaction between the dehydrated clay and alkali proceeds while the clay and alkali are in the form of a compact mass or masses thereof. Thus, if the mix is somewhat friable, such as may occur, for example, if we use a 50% or 55% solution of alkali, we compress the mix in a suitable press or extruder.

The compact clay-alkali mix may take any variety of forms or shapes. However, the masses should be 325 mesh or coarser so that the benefits of our process may be realized. The compact mix can be reacted in bulk form in the reaction vessel; the reaction product or polycrystalline transformation product thereof may then be granulated into any desired form. Alternatively, we may compress the mix into preforms of any desired size or shape.

The preferred embodiment of our invention contemplates the provision of uniformly sized coherent shaped masses of substantially pure zeolite crystals. Pursuant thereto, we mechanically shape a clay-alkali mix of suitable plastic consistency to form compact masses coarser than 325 mesh such as by extrusion, molding, pilling, spray drying or any other method known in the art for the purpose. For example, we have had success in extruding the clay-alkali mix in an auger extruder through a die plate and cutting the extrudate to form uniformly sized pellets of the desired dimension. For use in most gas treating processes, the pellets usually should be 4 to 8 mesh particles. No auxiliary binder is needed to produce our coherent pellets which are highly resistant to attrition and disintegration, even in the presence of liquid water. The pellets, if desired, may be crushed and screened to provide 60/100 mesh particles useful in fixed adsorption processes or 100/325 mesh particles for fluid bed operations.

The preferred method for forming 100/325 mesh zeolitic particles involves the initial step of preparing clay-alkali microspheres by a spray drying technique. In accordance with this method, the clay is mixed with the theoretical NaOH dosage, using dilute alkali, such as a 10% to 25% concentrated NaOH solution. The mixture is atomized into a heated chamber and mildly dried to bring the concentration of the alkali solution in the resultant microspheres to about 30% to 55%. Care must be exercised during the spray drying to keep the temperature of the microspheres below about 125° F., at or above which temperature basic sodalite will be formed by reaction between the alkali and the clay.

Irrespective of the particular form of the compact clay-alkali mixture used, the reaction between the clay and alkali is carried out at a low temperature, viz, between about 70° F. and about 115° F. and preferably at about 100° F. The successful progress of the reaction depends on thus restricting the temperature. We have found that when employing a reaction temperature of 125° F., the degree of zeolite formation is reduced markedly. If the reaction is carried out at temperatures about 225° F. or higher a material believed to be basic sodalite is formed to the exclusion of the zeolite. No agitation is required during the reaction period. The reaction may require from about 6 to 24 hours for completion, at which time the mix is converted into a coherent mass of homogeneous amorphous compositions which is crystallizable to the desired type A zeolite. To insure the completion of the reaction, a reaction period of 48 to 96 hours or more may be preferable. To determine the minimum reaction time required for the completion of the reaction between the alkali and dehydrated clay under the particular operating conditions employed, samples of the reaction product may be taken after various reaction intervals, crystallized (as hereafter described) and the intensity of the X-ray diffraction maxima characteristic of the desired crystalline zeolite studied; the reaction period should be prolonged until the product formed by crystallization of the amorphous reaction product gives rise to the most intense X-ray diffraction maxima characteristic of the desired zeolite.

The reaction is carried out under conditions such that the required amount of water is retained in the reaction mix for the formation of the zeolite and, accordingly, a closed reaction vessel is preferably used. However, in making large batches of the zeolite, the top layer of the reaction mixture may act, in effect, as a cover for the bulk of the mixture and thus insure the adequacy of the water content in the mixture. It is important to note that the reaction period may be prolonged for a month or longer without adverse effect and without danger of forming contaminating compounds. Provided intense agitation has not been employed during the reaction, the amorphous reaction product will be in essentially the same form as the compact clay-alkali mix, although it will be harder.

The amorphous material is aged to convert it into a polycrystalline state. The amorphous material will automatically convert to polycrystalline state if permitted to stand without dehydration at room temperature. Thus, after the amorphous material stands exposed to the atmosphere at room temperature for about 18 days, some conversion of the kaolin to the zeolite A will be evident and the extent of conversion will increase with time. Crystallization, however, will be accelerated by subjecting the amorphous material (in the presence of a quantity of water at least theoretical for the formation of $Na_2O \cdot Al_2O_3 \cdot 2SiO_{2.4-5}H_2O$) to elevated temperature within the range of from about 150° F. to about 325° F. for at least an hour, and usually 4 to 6 hours or more, under autogenous pressure. One eminently suitable method for crystallizing the amorphous reaction product involves refluxing the amorphous material in water, using a small amount of dilute alkali, if desired, to promote crystallization. Refluxing may be continued up to 48 hours or more without adverse effect. The polycrystalline aggregates may then be separated from the liquor, as by decantation, washed to remove free alkali if any is present, and air dried if a dry zeolite is required. The zeolite may be dehydrated substantially completely to form the sieve material by calcining at a temperature within the range of from about 220° F. to about 1000° F. and preferably between about 400° F. and 700° F. At temperatures higher than about 1000° F. the pore structure of the sorbent will collapse. The zeolite may be partially dehydrated for use in particular applications.

To provide other type A zeolites the dehydrated sodium zeolite A may be base-exchanged with, for example, K, Li, or divalent metal ions such as $Ca^{+2}$, $Mg^{+2}$, $Cd^{+2}$, $Zn^{+2}$ and $Mn^+$, etc. Upon dehydration, as described above, these base-exchanged zeolites become sorbents of controlled effective pore diameter. This base-exchanged step is conveniently accomplished by soaking, percolating, or otherwise contacting the zeolite with a dilute aqueous solution of a mineral acid salt of the above-mentioned ions (or other exchangeable ions) until the desired degree of ion-exchange has taken place.

The following examples of the practice of our invention are given for illustrative purpose only and are not to be construed as limiting our invention thereto.

EXAMPLE I

In this experiment hard, binder-free pellets composed essentially of pure 4A sodium zeolite were prepared from calcined kaolin clay.

The clay used in the example is known as Klondyke Water Washed kaolin, a high purity kaolinitic clay mined in Georgia and degritted by hydraulic classification. The $SiO_2/Al_2O_3$ weight ratio of the clay was 1.141. The powdered clay was calcined at 1400° F. for 17 hours to a volatile matter content of 0.6% before conversion into the zeolite, in accordance with the following steps:

Formation of pellets and reaction 60.0 parts by weight of the calcined kaolin was mixed and thoroughly blended with 43.2 parts by weight of a 50% NaOH solution. The mixture was compressed in a 1″ die and extruded through a die plate with 3/16″ holes (½″ land). The extrudate was cut in pellets about ¼″ long and the pellets were placed in an oven maintained at 100° F. for 96 hours to complete the reaction between the kaolin and the caustic. The pellets were hard at this stage. Analysis of X-ray diffraction intensity maxima indicated that only a very minor amount of the 4A zeolite was formed at this point.

Crystallization

The reacted pellets were refluxed in dilute caustic solution to crystallize the constituents into the 4A sodium zeolite. 5 parts by weight of 5% NaOH solution were used for each 1 part by weight of reacted pellets. After 2 hours of reflux, there was substantial formation of the 4A zeolite crystals and crystallization was substantially complete after a total of 4 hours of reflux. The pellets were water washed with several portions distilled water to remove any free alkali.

The pellets made in this run were hard polycrystalline masses.

EXAMPLE II

This example illustrates another embodiment of our invention.

60.0 parts by weight of the calcined kaolin of Example I were mixed to apparent homogeneity with 43.2 parts by weight of 50% NaOH solution and the mix compressed in a 2¼″ die. The compacted pieces hardened in less than one day, after which they were broken up into ½″ to 1″ fragments. The clay and alkali were reacted at room temperature for a total of 18 days and the fragments were further broken up in ¼″ pieces. At this stage a very small amount of the 4A zeolite was present.

A portion of the ¼″ pieces were permitted to stand in air at room temperature for about two months; it was found that there was substantial formation of crystals of the 4A hydrated zeolite.

Another portion of the ¼″ pieces was treated to accelerated crystallization by refluxing in a dilute NaOH solution using 1.0 part by weight of the pieces per 5.0 parts by weight of a 5% NaOH solution, separating the crystals and washing them with several portions of distilled water. After 1 hour, there was substantial zeolite formation which increased by refluxing for a total of 4 hours.

All of the zeolite pieces were very hard and difficult to break.

We claim:

1. A method of making a synthetic zeolite in the form of a hard coherent mass which comprises forming an apparently homogeneous compact mass consisting essentially of a mixture of dehydrated kaolin clay and an aqueous solution of NaOH, said aqueous solution having a concentration of from about 30% to about 55% and being present in an amount to provide about 9.0 gram mols of NaOH per kilogram of said clay, on a volatile free clay basis, reacting said clay with said NaOH while controlling the temperature of said mass within the range of about 70° F. to about 115° F. until a homogeneous amorphous reaction product is formed, and aging said amorphous reaction product in the presence of water at a temperature of from about 70° F. to about 325° F. for a time sufficient to convert said amorphous product into a homogeneous polycrystalline zeolitic mass.

2. A method of making a synthetic sorbent in the form of a hard coherent mass which comprises forming an apparently homogeneous compact mass consisting essentially of a mixture of dehydrated kaolin clay and an aqueous solution of NaOH, said aqueous solution having a concentration of from about 30% to about 55% and bearing present in an amount to provide about 9.0 gram mols of NaOH per kilogram of said clay, on a volatile free clay basis, reacting said clay with said NaOH while controlling the temperature of said mass within the range of about 70° F. to about 115° F. until a homogeneous amorphous reaction product is formed, aging said amorphous reaction product in the presence of water at a temperature of from about 70° F. to about 325° F. for a time sufficient to convert said amorphous reaction product into a homogeneous polycrystalline zeolite and dehydrating said polycrystalline mass at a temperature within the range of from about 220° F. to about 1000° F.

3. A method of making a synthetic zeolite in the form of hard coherent shaped particles which comprises forming an apparently homogeneous compact mass consisting essentially of a mixture of dehydrated kaolin clay and an aqueous solution of NaOH, said aqueous solution having a concentration of from about 30% to about 55% and being present in an amount to provide about 9.0 gram mols of NaOH per kilogram of said clay, on a volatile free clay basis, forming said mixture into shaped particles, reacting said clay with said NaOH while controlling the temperature within the limits of about 70° F. to about 115° F. until an amorphous homogeneous reaction product in the form of said shaped particles is obtained, and, without breaking down the form of said shaped particles, aging said shaped particles in the presence of heat and water for a time sufficient to crystallize said amorphous reaction product.

4. A method of making a synthetic zeolite in the form of hard coherent pellets which comprises forming an apparently homogeneous compact mass consisting essentially of dehydrated kaolin clay and an aqueous solution of NaOH, said aqueous solution having a concentration of from about 30% to about 55% and being present in an amount to provide about 9.0 gram mols of NaOH per kilogram of said clay, on a volatile free clay basis, extruding said mass so as to form pellets therefrom, reacting said clay with said NaOH while controlling the temperature within the limits of about 70° F. to about 115° F. until an amorphous homogeneous reaction product in the form of said pellets is obtained, and aging said pellets in the presence of heat and water for a time sufficient to crystallize said amorphous reaction product.

5. A method of making a synthetic crystalline zeolite in the form of coherent microspheres which comprises forming a mixture consisting essentially of dehydrated kaolin clay and a dilute aqueous solution of NaOH in amount to provide about 9.0 gram mols of NaOH per kilogram of said clay, on a volatile free clay basis, spray drying the mixture under conditions such that the concentration of the NaOH solution in the resultant microspheres is within the range of about 30% to about 55%, reacting said clay and said NaOH while controlling the temperature within the range of 70° F. to about 115° F. until an amorphous homogeneous reaction product is obtained, and aging said microspheres at an elevated temperature in the presence of water for a time sufficient to crystallize said amorphous reaction product so as to obtain the desired crystalline zeolitic microspheres.

References Cited in the file of this patent

UNITED STATES PATENTS

| | | |
|---|---|---|
| 1,477,757 | Hughes et al. | Dec. 18, 1923 |
| 1,499,795 | Wherry | July 1, 1924 |
| 2,143,670 | Young | Jan. 10, 1939 |
| 2,544,695 | Kumins | Mar. 13, 1951 |